United States Patent
Madiraju Varadaraju

(10) Patent No.: US 9,633,027 B1
(45) Date of Patent: Apr. 25, 2017

(54) HIGH SPEED BACKUP

(71) Applicant: EMC IP Holding Company LLC, Hopkinton, MA (US)

(72) Inventor: Kiran Kumar Madiraju Varadaraju, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 13/830,421

(22) Filed: Mar. 14, 2013

(51) Int. Cl.
*G06F 17/30* (2006.01)

(52) U.S. Cl.
CPC .............. *G06F 17/30091* (2013.01)

(58) Field of Classification Search
CPC ................................. G06F 17/30091
See application file for complete search history.

(56) References Cited

U.S. PATENT DOCUMENTS

| | | | | |
|---|---|---|---|---|
| 8,370,819 B2* | 2/2013 | Chakraborty | ............. | G06F 8/63 703/27 |
| 9,104,339 B1* | 8/2015 | Kalekar | ................. | G06F 3/061 |
| 9,239,814 B2* | 1/2016 | Lagergren | ............. | G06F 9/4401 |
| 2010/0235831 A1* | 9/2010 | Dittmer | ............................ | 718/1 |
| 2012/0016840 A1* | 1/2012 | Lin | ..................... | G06F 11/2097 707/626 |
| 2012/0066677 A1* | 3/2012 | Tang | ................................ | 718/1 |
| 2012/0233434 A1* | 9/2012 | Starks et al. | ................. | 711/170 |
| 2013/0041927 A1* | 2/2013 | Song | .................... | G06F 3/0608 707/813 |
| 2014/0033188 A1* | 1/2014 | Beavers | .................... | G06F 8/65 717/170 |
| 2014/0108723 A1* | 4/2014 | Nowoczynski et al. | ...... | 711/113 |
| 2014/0195791 A1* | 7/2014 | Teli | ..................... | G06F 11/1417 713/2 |
| 2014/0289354 A1* | 9/2014 | Green | .................. | G06F 3/0617 709/212 |

* cited by examiner

*Primary Examiner* — Huawen A Peng
(74) *Attorney, Agent, or Firm* — Van Pelt, Yi & James LLP

(57) ABSTRACT

High speed backup of a target volume to a VHD format is disclosed. In various embodiments, a hint data indicating a last known file system extent associated with a previously-processed data zone is received. The hint data is used to determine a starting file system extent at which to begin processing file system extent data of the target volume to find file system extents associated with a VHD data zone that is currently being processed.

16 Claims, 4 Drawing Sheets

HIGH SPEED BACKUP

BACKGROUND OF THE INVENTION

The virtual hard disk (VHD) file format can be used to back up a target volume, for example a volume stored on a production system hard drive. The VHD format is a container format which can contain disk related information. VHD files which can be mounted and used as a regular disk can be easily created. Volumes such as NTFS/ReFS/FAT32 or any file system which the operating system (OS) supports on the mounted disk can also be created. Differencing VHD's can be created which will have internal references to parent VHD.

EMC Networker® backup solution includes an ability to create a full and incremental backup of a target volume by copying all or only changed blocks of the target volume into a VHD format. The software module creates a VHD stream which contains all the VHD related metadata and the disk metadata such as MBR (Master Boot Record), GPT (GUID Partition Table) and the volume contents on the fly, which will then be streamed to the backup medium such as tape or disk targets as a single stream. The resulting save set can then be mounted which will contain the volume to be backed up for recovery purposes. The resulting VHD file contains only one volume, which makes it easier to chain incremental backups of a particular volume, which will be linked to its parent.

Each data block region of the VHD format includes a sector bitmap and data. For dynamic disks, the sector bitmap indicates which sectors contain valid data (1's) and which sectors have never been modified (0's). For differencing disks, the sector bitmap indicates which sectors are located within the differencing disk (1's) and which sectors are in the parent (0's). The bitmap is padded to a 512-byte sector boundary.

A block is a power-of-two multiple of sectors. By default, the size of a block is 4096 512-byte sectors (2 MB). All blocks within a given image must be the same size. This size is specified in the "Block Size" field of the Dynamic Disk Header.

All sectors within a block whose corresponding bits in the bitmap are zero must contain 512 bytes of zero on disk. Software that accesses the disk image may take advantage of this assumption to increase performance.

On a target volume which has high number of file system extents, the time taken to prepare the sector bitmap for each data block region takes very long time, thus affecting the number of data block extents prepared per second.

Typically, common extents for a given data block zone have been found by looping through all the known file system volume extents as shown in the above table sequentially. Every time a data block zone is prepared the routine which finds out common extents starts from the first file system extent.

BRIEF DESCRIPTION OF THE DRAWINGS

Various embodiments of the invention are disclosed in the following detailed description and the accompanying drawings.

DETAILED DESCRIPTION

Figure 1:
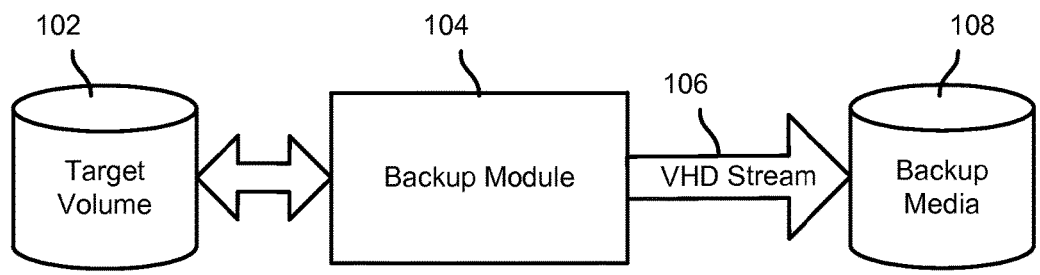
FIG. 1 is a block diagram illustrating an embodiment of backup system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to increase the speed and efficiency of block based backup of a target volume to the VHD format are disclosed. In various embodiments, upon completing file system extent discovery for a data block in the VHD format, a cookie or other data indicating the last known file system extent, i.e., the last one found to be included in the current VHD data zone, is passed to the software module or other processing entity provided to find common file system extents (i.e., those included in a given VHD data zone), is passed as a hint to the calling module that called the routine that finds file system extents that are within a given data zone. The calling module provides the hint to this routine when it calls the routine to find file system extents for the next VHD data zone, which tells the routine where to begin searching for common extents for that data zone. In various embodiments, the routine uses the cookie or other hint to skip over file system extent indexes that have already been found to be included in previously-processed VHD data zones. The technique in various embodiments takes advantage of the fact that the data block extents are always prepared in ascending order, e.g., 0-2 MB first, 2 MB-4 MB, 8 MB-10 MB and so on; even though the data block extents are not necessarily continuous, in various embodiments they are always processed in increasing order.

FIG. 1 is a block diagram illustrating an embodiment of backup system. In the example shown, a target volume 102 is backed up by a backup module 104, e.g., a software module executing on a processor comprising a file server or other system. In the example shown, the backup module 104 backs up the target volume 102 by generating and streaming a VHD data stream 106 to backup media 108, such as magnetic tape, optical disk, hard disk drive, or other backup media. The resulting save set, i.e., the VHD file stored to the backup media 108, can then be mounted and used to recover the target volume, if needed.

Figure 2:
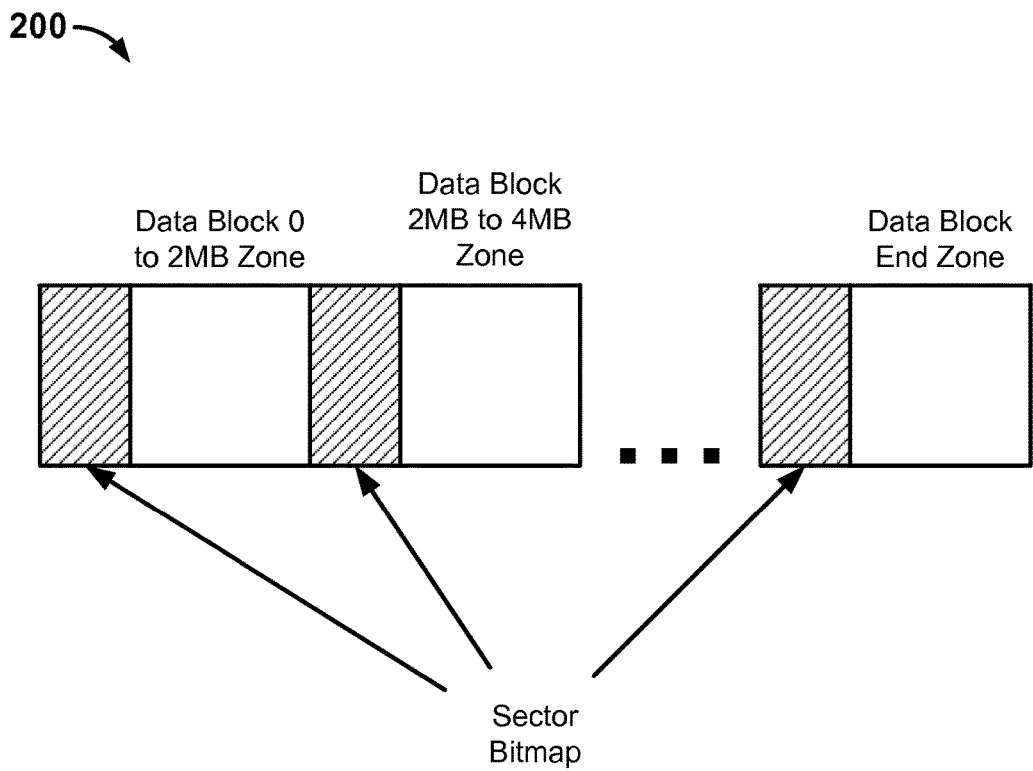
FIG. 2 is a block diagram illustrating an embodiment of data block portion of a file in the VHD format.

FIG. 2 is a block diagram illustrating an embodiment of data block portion of a file in the VHD format. In the example shown, the data portion 200 of the VHD file, corresponding to a data portion of the VHD stream 106 in the example shown in FIG. 1, includes a series of ascending data zones (e.g., 0 to 2 MB, 2 MB to 4 MB, etc., up to an "end" zone), each of which is preceded by a sector bitmap, as described above. In various embodiments, a backup module such as module 104 of FIG. 1, calls a routine to determine file system extents included in a given data zone, and uses the file system extent information and/or associated metadata to generate and stream as output the sector bitmap for that data zone. As noted above, for a file system with numerous extents, the identification of "common" extents (i.e., file system extents that are within the current data zone) can consume significant time and/or other resources.

Figure 3:
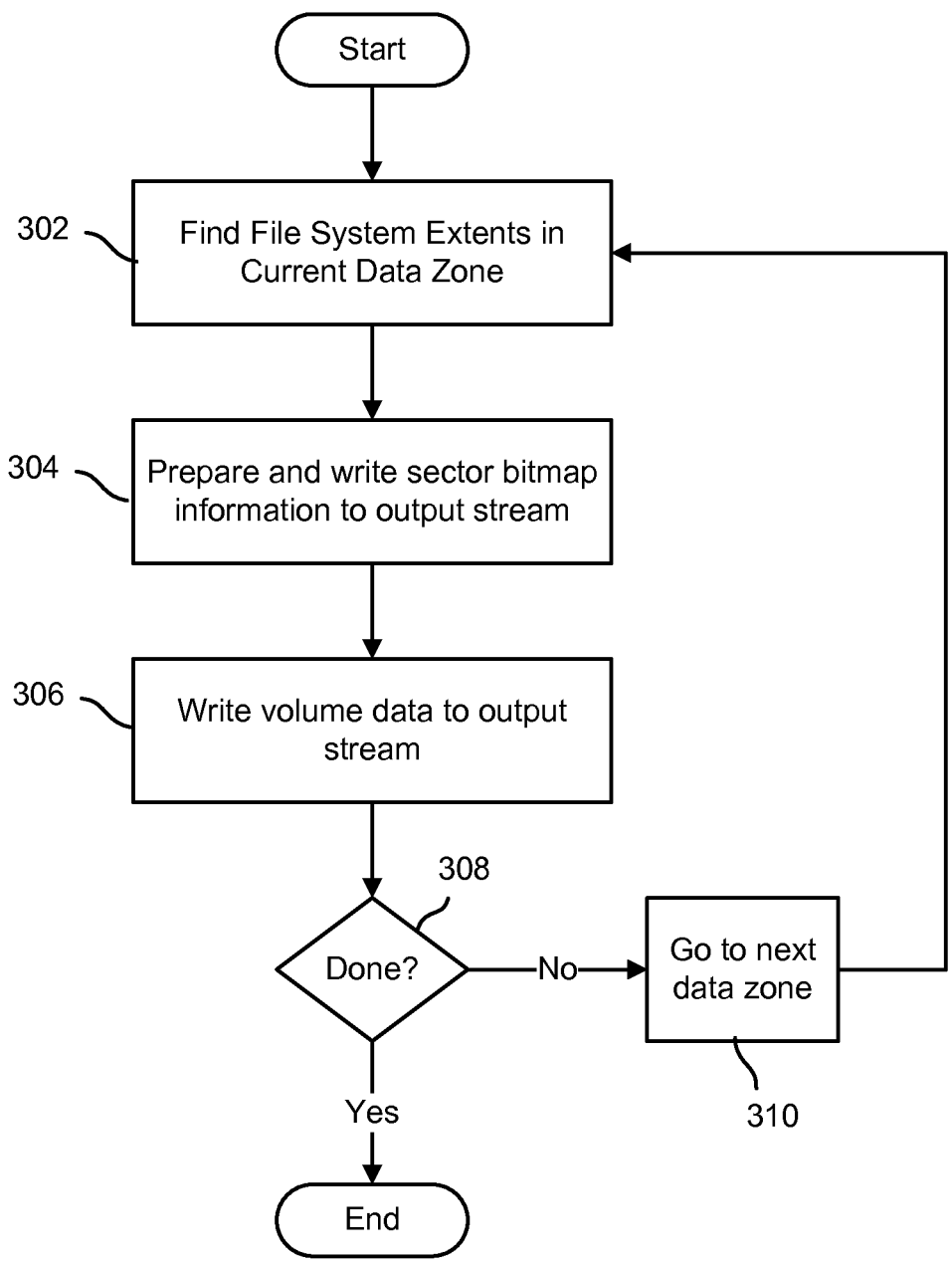
FIG. 3 is a flow chart illustrating an embodiment of a process to back up data.

FIG. 3 is a flow chart illustrating an embodiment of a process to back up data. In the example shown, file system extents common to the current VHD data zone are found (302). For example, file system data read from the target volume may be used to determine which file system extents are in the current data zone. Sector bitmap data for the current data zone is generated (e.g., based on metadata read from the target volume and the file system extents determined to be in the current data zone) and provided as output, e.g., written to the VHD data stream, such as stream 106 of FIG. 1 (304). Target volume data in the current data zone is read from the target volume and written to the output stream (306). If there are more data zones to process (308), processing advances to the next data zone (310) and steps 302, 304, and 306 are performed for the next data zone. Processing continues until all data zones in the target volume have been processed (308).

Figure 4:
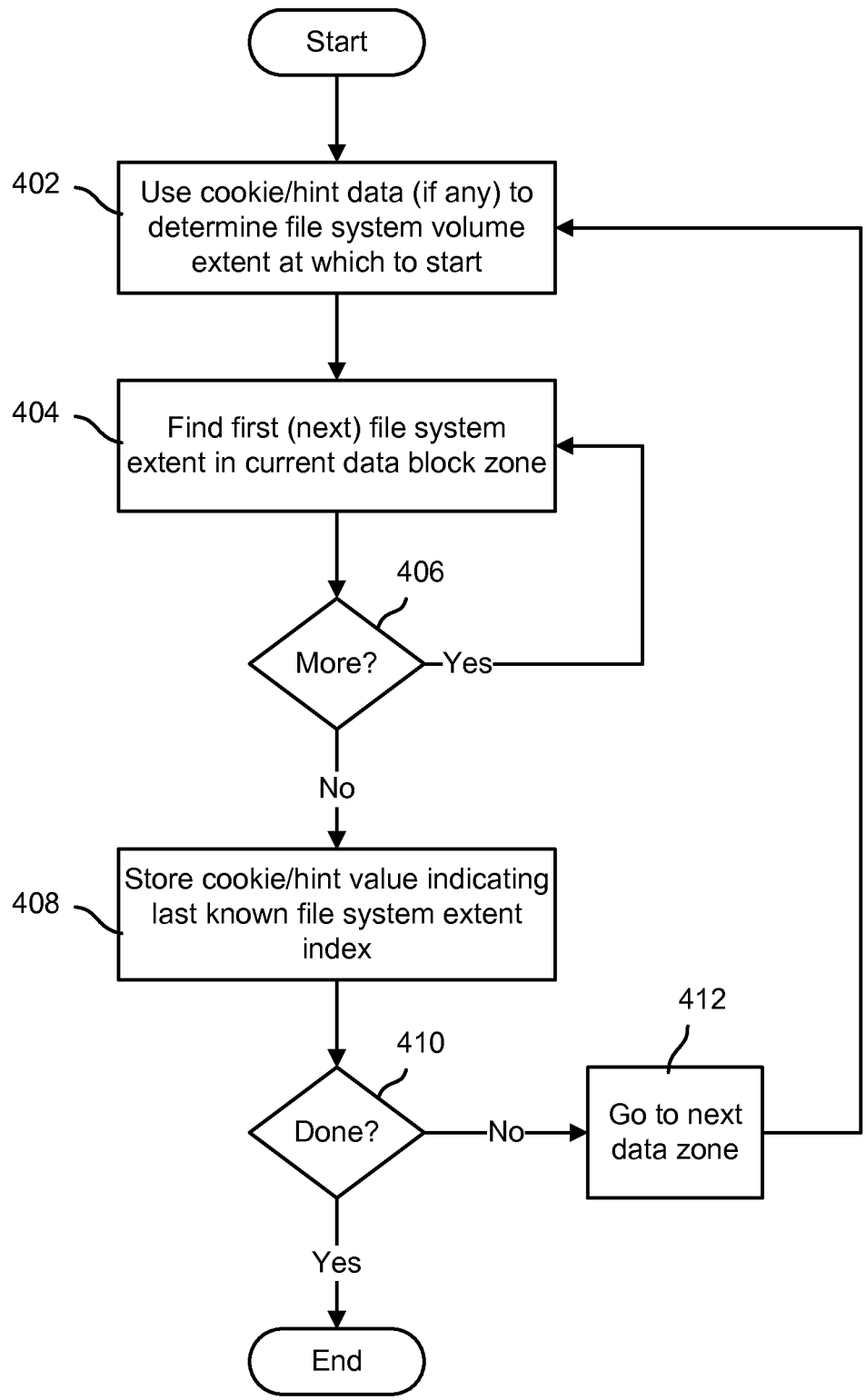
FIG. 4 is a flow chart illustrating an embodiment of a process to determine file system extents common to a given VHD data zone.

FIG. 4 is a flow chart illustrating an embodiment of a process to determine file system extents common to a given VHD data zone. In various embodiments, the process of FIG. 4 is included in and/or performed by a routine called in connection with performance of step 304 of FIG. 3. In the example shown, a cookie or other "hint" data, received for example from a calling module that called a routine configured to implement the process of FIG. 4, is used to determine a file system extent of the target volume at which to start processing file system extents to identify file system extents common to the current VHD data zone (402). In some embodiments, the cookie or other hint data comprises a file system extent index indicating an ordinal location within a table, list, or other set of file system extent data that was the last location determined to be included in a previously-processed VHD data zone. A first (or next) file system extent included in the current data zone is determined (404). Step 404 is repeated until no further file system extents that are included in the data zone are found (406). A cookie/hint data indicating a last known file system extent, e.g., the last one found to be included in the data zone just processed, is stored and/or passed to the calling module (408). If another zone is to be processed (410) processing advances to the next data zone (412), for example in response to a call from the calling module. The process of FIG. 4 repeats for each data zone, in ascending order, until there are no further data zones to process (410).

In the following illustrative example, the file system extents of the target volume are as indicated in the following table:

| File System Extent Index | Block Number | Block Count |
| --- | --- | --- |
| 0 | 0 | 2 KB |
| 1 | 4 KB | 4 KB |
| 2 | 2 MB | 512 KB |
| 3 | 4 MB | 64 KB |
| 4 | 6 MB | 8 KB |
| ... | ... | ... |
| ... | ... | ... |

In various embodiments, use of techniques described herein would result in processing as indicated in the following table:

| Data Zone | Input Cookie Value | Extents Fitted in Zone | Cookie Value Returned |
| --- | --- | --- | --- |
| 0-2 MB | 0 | $1^{st}$ and $2^{nd}$ | 1 |
| 2 MB-4 MB | 1 | $3^{rd}$ | 2 |
| 4 MB-6 MB | 2 | $4^{th}$ | 3 |
| 6 MB-8 MB | 3 | $5^{th}$ | 4 |

In various embodiments, use of techniques disclosed herein can result in greater speed and efficiency in terms of the time taken to prepare the sector bitmaps for data zones, particularly in some embodiments starting in the mid-range of data zones. The below example shows the time taken to prepare sector bitmaps first not using techniques disclosed herein, such as providing a hint as to the last known file system extent ("Old Method") as compared to the time required when techniques disclosed herein were used ("New Method"):

| Data Block Extent Start Range | Start Time (Old Method) | End Time (Old Method) | Start Time (New Method) | End Time (New Method) |
| --- | --- | --- | --- | --- |
| 3978752 | 14:26:40:15 ms | 14:26:40:15 ms | 15:18:28:316 ms | 15:18:28:316 ms |
| 6076416 | 14:26:40:30 ms | 14:26:40:30 ms | 15:18:28:347 ms | 15:18:28:347 ms |
| 8174080 | 14:26:40:47 ms | 14:26:40:47 ms | 15:18:28:378 ms | 15:18:28:378 ms |
| ... | ... | ... | ... | ... |
| ... | ... | ... | ... | ... |
| ... | ... | ... | ... | ... |
| ... | ... | ... | ... | ... |
| 1726160896 | 14:27:41:261 ms | 14:27:41:277 ms | 15:19:1:996 ms | 15:19:1:996 ms |

| Data Block Extent Start Range | Start Time (Old Method) | End Time (Old Method) | Start Time (New Method) | End Time (New Method) |
| --- | --- | --- | --- | --- |
| 1728258560 | 14:27:41:324 ms | 14:27:41:355 ms | 15:19:2:43 ms | 15:19:2:43 ms |
| 1730356224 | 14:27:41:386 ms | 14:27:41:417 ms | 15:19:2:74 ms | 15:19:2:74 ms |
| 1732453888 | 14:27:41:449 ms | 14:27:41:480 ms | 15:19:2:121 ms | 15:19:2:121 ms |
| 1734551552 | 14:27:41:511 ms | 14:27:41:542 ms | 15:19:2:152 ms | 15:19:2:152 ms |
| 1736649216 | 14:27:41:573 ms | 14:27:41:605 ms | 15:19:2:199 ms | 15:19:2:199 ms |
| 1738746880 | 14:27:41:636 ms | 14:27:41:667 ms | 15:19:2:230 ms | 15:19:2:230 ms |
| 1740844544 | 14:27:41:698 ms | 14:27:41:729 ms | 15:19:2:277 ms | 15:19:2:277 ms |
| 1742942208 | 14:27:41:761 ms | 14:27:41:792 ms | 15:19:2:308 ms | 15:19:2:308 ms |

As illustrated above when the data block extent is nearer to the start there is no difference in time between the old and the new method. But when the data block extent range approaches the mid-range then the old method starts to take about 15-25 milliseconds time; but the difference between the start and end time in milliseconds of the new method approaches zero.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data of a target volume to a virtual hard disk (VHD) format that includes a plurality of data zones, comprising:
    receiving, at a processor, a hint data indicating a last known file system extent associated with a previously-processed data zone, the hint data comprising a file system extent index that associates a plurality of file system extents with corresponding locations of the plurality of file system extents;
    using, by the processor, the hint data, for each data zone of the plurality of data zones, to identify common file system extents between the target volume and a VHD data zone, including by using the hint data to determine a starting file system extent at which to begin processing file system extent data of the target volume to find file system extents associated with the VHD data zone that is currently being processed; and
    generating, by the processor, a sector bitmap, for each data zone of the plurality of data zones, based in part on the identified common file system extents and using the hint data when generating the sector bitmap to skip over one or more file system extents found previously to be associated with one or more previously-processed VHD data zones.

2. The method of claim 1, further comprising passing to a calling module, at the conclusion of processing file system extent data for the VHD data zone that is currently being processed, a current hint data indicating a last known file system extent index determined to be associated with the VHD data zone the processing of which was just concluded.

3. The method of claim 1, wherein the hint data comprises a cookie.

4. The method of claim 1, wherein the hint data comprises a file system extent index.

5. The method of claim 1, wherein the hint is received from a calling module.

6. The method of claim 1, wherein successive VHD data zones are processed in an ascending order.

7. The method of claim 1, further comprising writing the sector bitmap for the VHD data zone that is currently being processed to an output stream.

8. The method of claim 1, further comprising writing the sector bitmap for the VHD data zone that is currently being processed to a backup media.

9. A system to back up data of a target volume to a VHD format that includes a plurality of data zones, comprising:
    a processor configured to:
        receive a hint data indicating a last known file system extent associated with a previously-processed data zone, the hint data comprising a file system extent index that associates a plurality of file system extents with corresponding locations of the plurality of file system extents;
        use the hint data, for each data zone of the plurality of data zones, to identify common file system extents between the target volume and a VHD data zone, including by using the hint data to determine a starting file system extent at which to begin processing file system extent data of the target volume to find file system extents associated with the VHD data zone that is currently being processed; and
        generate a sector bitmap, for each data zone of the plurality of data zones, based in part on the identified common file system extents and using the hint data when generating the sector bitmap to skip over one or more file system extents found previously to be associated with one or more previously-processed VHD data zones; and
    a memory coupled to the processor and configured to store the hint data.

10. The system of claim 9, wherein the processor is further configured to pass to a calling module, at the conclusion of processing file system extent data for the VHD data zone that is currently being processed, a current hint data indicating a last known file system extent index determined to be associated with the VHD data zone the processing of which was just concluded.

11. The system of claim 9, wherein the hint data comprises a cookie.

12. The system of claim 9, wherein the hint data comprises a file system extent index.

13. The system of claim 9, wherein successive VHD data zones are processed in an ascending order.

14. The system of claim 9, wherein the processor is further configured to write the sector bitmap for the VIII) data zone that is currently being processed to an output stream.

15. A computer program product to back up data of a target volume to a VHD format that includes a plurality of data zones, the computer program product being embodied in a tangible, non-transitory computer readable storage medium and comprising computer instructions for:
- receiving a hint data indicating a last known file system extent associated with a previously-processed data zone, the hint data comprising a file system extent index that associates a plurality of file system extents with corresponding locations of the plurality of file system extents;
- using the hint data, for each data zone of the plurality of data zones, to identify common file system extents between the target volume and a VIII) data zone, including by using the hint data to determine a starting file system extent at which to begin processing file system extent data of the target volume to find file system extents associated with the VHD data zone that is currently being processed; and
- generating, for each data zone of the plurality of data zones, a sector bitmap based in part on the identified common file system extents and using the hint data when generating the sector bitmap to skip over one or more file system extents found previously to be associated with one or more previously-processed VHD data zones.

16. The computer program product of claim 15, writing the sector bitmap for the VHD data zone that is currently being processed to an output stream.

\* \* \* \* \*